United States Patent
Lee et al.

(10) Patent No.: US 12,214,790 B2
(45) Date of Patent: Feb. 4, 2025

(54) ECO-FRIENDLY VEHICLE AND METHOD FOR EVALUATING VALET MODE DRIVING THEREFOR

(71) Applicants: Hyundai Motor Company, Seoul (KR); Kia Corporation, Seoul (KR)

(72) Inventors: Gyu Ri Lee, Gyeonggi-do (KR); Seong Wook Moon, Seoul (KR); Do Hwa Kim, Seoul (KR); Sung Bae Jeon, Gyeonggi-do (KR); Sung Il Jung, Busan (KR); Jae Young Park, Gyeonggi-do (KR); Jeong Eun Kim, Seoul (KR); Hui Un Son, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 262 days.

(21) Appl. No.: 18/071,419

(22) Filed: Nov. 29, 2022

(65) Prior Publication Data

US 2023/0202484 A1    Jun. 29, 2023

(30) Foreign Application Priority Data

Dec. 29, 2021   (KR) .................. 10-2021-0191762

(51) Int. Cl.
  *B60W 50/04*   (2006.01)
  *B60W 40/02*   (2006.01)
  *B60W 40/09*   (2012.01)

(52) U.S. Cl.
  CPC ............ *B60W 40/09* (2013.01); *B60W 40/02* (2013.01); *B60W 50/04* (2013.01); *B60W 2556/45* (2020.02)

(58) Field of Classification Search
  CPC ...... B60W 40/09; B60W 40/02; B60W 50/04; B60W 2556/45
  See application file for complete search history.

(56) References Cited

U.S. PATENT DOCUMENTS

| | | |
|---|---|---|
| 10,384,688 B2 | 8/2019 | Lindelöf |
| 11,074,539 B2 | 7/2021 | Tiderington |
| 11,136,042 B1 | 10/2021 | Fields et al. |

FOREIGN PATENT DOCUMENTS

| | | |
|---|---|---|
| JP | 2018-041381 A | 3/2018 |
| JP | 2021-096688 A | 6/2021 |
| KR | 102266873 B1 | 6/2021 |

*Primary Examiner* — Mathew Franklin Gordon
(74) *Attorney, Agent, or Firm* — Fox Rothschild LLP

(57) ABSTRACT

Disclosed may be a method for evaluating valet mode driving of a vehicle. The method includes determining whether or not a valet mode entry condition may be satisfied, determining a plurality of driving evaluation factors for valet parking based on at least one of a vehicle status or a driving environment, upon determining that the valet mode entry condition may be satisfied, calculating a valet driving evaluation score by analyzing the determined driving evaluation factors and collecting result values acquired through analysis, and displaying the calculated valet driving evaluation score.

17 Claims, 12 Drawing Sheets

FIG. 3B

| | | | | | 04:05 JANUARY 1 (Wed.) | |
|---|---|---|---|---|---|---|
| ● | ● | ● | ● | colspan="2" | VALET MODE | |
| | | | | colspan="2" | PLEASE SET A NEW PASSWORD TO START VALET MODE | The VALET MODE IS RUNNING. THE CURRENT POSITION AND DRIVING INFORMATION OF VEHICLE ARE TRANSMITTED TO A SUBSCRIBER OF VEHICLE THROUGH BLUELINK APP. |
| 1 | 2 | 3 | ⌫ | VALET MODE START | 04 : 05 | |
| 4 | 5 | 6 | | STARTING TERMINATION | - | |
| 7 | 8 | 9 | CONFIRM | DRIVING DISTANCE | 0 km | |
| * | 0 | # | | TRAVELING TIME | 0 min | |

ECO-FRIENDLY VEHICLE AND METHOD FOR EVALUATING VALET MODE DRIVING THEREFOR

PRIORITY

This application claims under 35 U.S.C. § 119(a) the benefit of Korean Patent Application No. 10-2021-0191762, filed on Dec. 29, 2021, which is hereby incorporated by reference as if fully set forth herein.

BACKGROUND OF THE DISCLOSURE

Field of the Disclosure

The present disclosure relates to an eco-friendly vehicle and a method for evaluating valet mode driving therefor.

Discussion of the Related Art

A valet mode indicates a mode in which, when people other than a vehicle owner temporarily drive a vehicle, as in use of a valet parking service, the vehicle owner selects only necessary information and functions so as to allow others to use and execute the selected information and functions while protecting personal information, before handing the vehicle over to others.

The general valet mode may be implemented in a form in which driving distance and time, the maximum speed, etc. until the engine of the vehicle may be turned off may be recorded and notified to the vehicle owner through an application installed in the smartphone of the vehicle owner, or may be notified to the vehicle owner through an output unit within the vehicle when the vehicle owner releases the valet mode in the corresponding vehicle.

In addition to this way of notifying about the driving history of the vehicle in the absence of the driver, a function of limiting some functions of an Audio, Video and Navigation (AVN) system (for example, lock of reading of a navigation destination setting history, prohibition of access to a driver profile, limit of a wireless connection function, etc.) may be provided so as to protect the personal information of the vehicle owner.

Further, when the valet mode may be activated, access to a specific space in the vehicle, such as lock of a trunk or a glove box, may be limited, or an engine output or RPM may be limited depending on the vehicle.

However, the above-described general valet mode may be simply controlled in an on-off mode and thus detailed control of the valet mode depending on the situation may be impossible, and characteristics of Electric Vehicles (EVs) or Hybrid Electric Vehicles (HEVs), which become popular recently, may not be considered in the valet mode. For example, since the valet mode may be in general activated in a parking lot, the vehicle may be generally driven a short distance at a low speed, but unnecessary engine starting may occur due to conditions (heating of an engine catalyst, air conditioning, etc.) other than high demand power and no consideration of such engine starting becomes problematic.

SUMMARY OF THE DISCLOSURE

Accordingly, the present disclosure may be directed to an eco-friendly vehicle and a method for evaluating valet mode driving therefor that substantially obviate one or more problems due to limitations and disadvantages of the related art.

An object of the present disclosure may be to provide an eco-friendly vehicle and a method for evaluating valet mode driving therefor in which a valet driving evaluation score may be quantified based on at least one driving evaluation factor in the valet mode of the eco-friendly vehicle.

Additional advantages, objects, and features of the disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for evaluating valet mode driving of a vehicle includes determining whether or not a valet mode entry condition may be satisfied, determining a plurality of driving evaluation factors for valet parking based on at least one of a vehicle status or a driving environment, upon determining that the valet mode entry condition may be satisfied, calculating a valet driving evaluation score by analyzing the determined driving evaluation factors and collecting result values acquired through analysis, and displaying the calculated valet driving evaluation score.

In another embodiment of the present disclosure, an apparatus for evaluating valet mode driving of a vehicle includes an entry determiner configured to determine whether or not a valet mode entry condition may be satisfied, an evaluation factor determiner configured to determine a plurality of driving evaluation factors for valet parking based on at least one of a vehicle status or a driving environment, upon determining that the valet mode entry condition may be satisfied, a controller including an evaluation score calculator configured to calculate a valet driving evaluation score by analyzing the determined driving evaluation factors and collecting result values acquired through analysis, and a display configured to display the calculated valet driving evaluation score.

It may be to be understood that both the foregoing general description and the following detailed description of the present disclosure may be exemplary and explanatory and may be intended to provide further explanation of the disclosure as claimed.

BRIEF DESCRIPTION OF THE DRAWINGS

The accompanying drawings, which may be included to provide a further understanding of the disclosure and may be incorporated in and constitute a part of this application, illustrate embodiment(s) of the disclosure and together with the description serve to explain the principle of the disclosure. In the drawings:

FIGS. 3A and 3B are diagrams showing an example of implementation of the valet mode according to one embodiment of the present disclosure;

FIGS. 5A to 9 are diagrams illustrating examples of display of the process of evaluating valet mode driving of the vehicle according to one embodiment of the present disclosure through a display or an application. FIGS. 5A, 5B, 5C, and 5D illustrate exemplary displays including exemplary display messages regarding the driving guide; FIG. 6 illustrates an exemplary calculated valet driving evaluation score through an exemplary display; FIG. 7 illustrates an exemplary display including a warning message or a warning notification; and FIGS. 8A, 8B, 8C, and 9 illustrates exemplary displays including a message on comprehensive evaluation of the valet driver to an application installed in the smart device of the vehicle owner.

DETAILED DESCRIPTION OF THE DISCLOSURE

Figure 1:
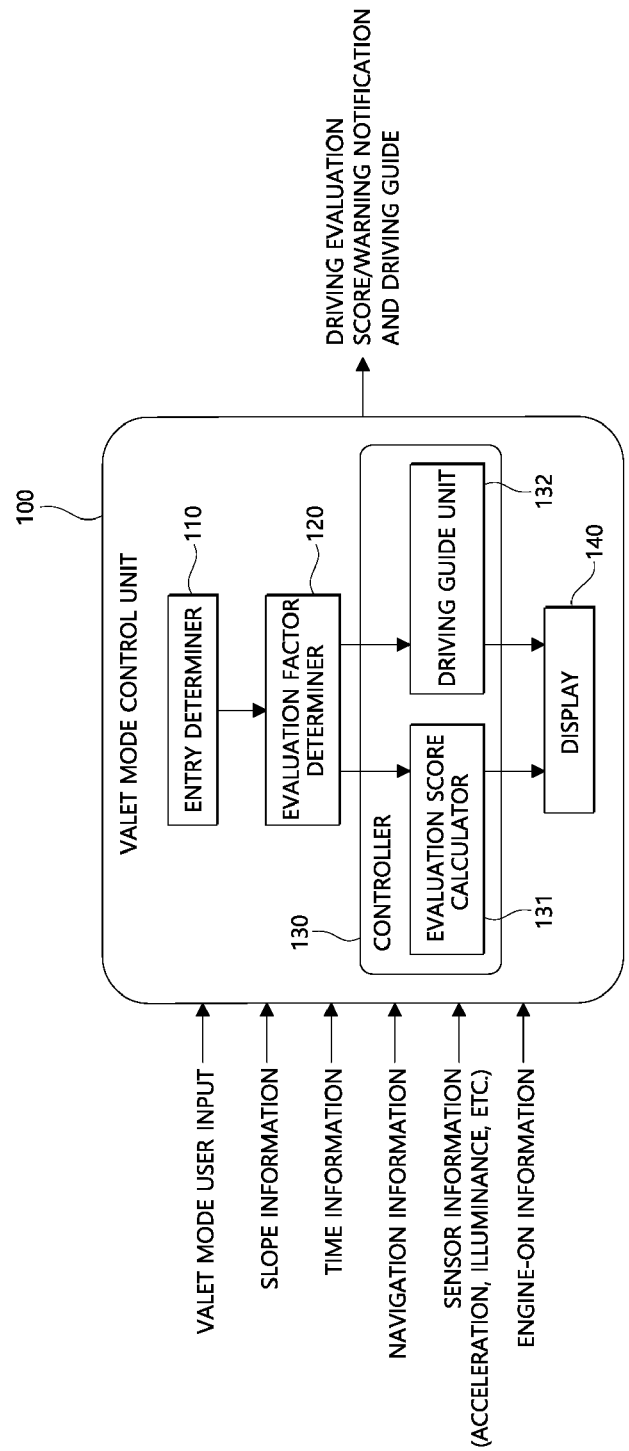
FIG. 1 is a block diagram showing an example of the configuration of a control unit which controls driving evaluation in a valet mode according to one embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

As used herein, the suffixes "module" and "unit" may be added or used interchangeably to facilitate preparation of this specification and may not be intended to suggest distinct meanings or functions. In describing embodiments disclosed in this specification, relevant well-known technologies may not be described in detail in order not to obscure the subject matter of the embodiments disclosed in this specification.

In addition, it should be noted that the accompanying drawings may be only for easy understanding of the embodiments disclosed in the present specification, and should not be construed as limiting the technical spirit disclosed in the present specification, and it will be understood that the embodiments specified in the following description and the configuration shown in the drawings cover modifications, equivalents or alternatives which come within the scope and technical range of the present disclosure at the time of application thereof.

In the following description of the embodiments, terms, such as "first" and "second", may be used only to describe various elements, and these elements should not be construed as being limited by these terms. These terms may be used only to distinguish one element from other elements.

When an element or layer may be referred to as being "connected to" or "coupled to" another element or layer, it may be directly connected or coupled to the other element or layer, or intervening elements or layers may be present. In contrast, when an element or layer may be referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" may be inclusive and therefore specify the presence of stated features, integers, steps, operations, elements, components, and/or combinations thereof, but do not preclude the presence or addition of one or more other features, integers, steps, operations, elements, components, and/or combinations thereof.

Further, the term "control unit" included in Motor Control Unit (MCU), Hybrid Control Unit (HCU), etc. may be widely used to refer to a controller configured to control a specific function of a vehicle, but does not mean a generic functional unit. For example, each control unit may include a communication device configured to communicate with other controllers or sensors, a memory configured to store operating systems, logic commands, input and output information, etc., and at least one processor configured to perform determination, calculation, judgement, etc. necessary to control a function assigned to the controller so as to control the function.

Embodiments of the present disclosure suggest to quantify accurate evaluation of valet parking by analyzing driving evaluation factors in consideration of characteristics of an eco-friendly vehicle as well as a driving environment until parking of the eco-friendly vehicle has been completed, and calculating a valet driving evaluation score based on results of the analysis, in provision of a valet mode function in the eco-friendly vehicle.

Further, the embodiments of the present disclosure suggest to control an eco-friendly vehicle to be stably driven and to be parked in a safe place by guiding the eco-friendly vehicle so as to be suited to a vehicle status or a driving environment in the valet mode.

The "valet mode" stated hereinafter may indicate a mode in which at least some settings may be changed or at least some functions and/or performances may be limited, assuming that the owner of an eco-friendly vehicle, i.e., a main driver, or a driver who drives the eco-friendly vehicle to a specific region in which driver replacement may be expected, may be replaced with another driver.

Further, a plurality of driving evaluation factors may be operated or calculated as designed scores depending on evaluation indexes, and may be classified by a plurality of levels depending on predetermined threshold values.

Further, kinds of execution, change and limit of vehicle functions may include at least one of 1) an engine starting line serving as an engine starting condition in a hybrid powertrain, 2) air-conditioning performance control, 3) speed limit, 4) acceleration limit, 5) parking impact reduction, 6) a driver evaluation function, 7) a parking spot feedback function, 8) a drive mode (an eco, normal or sports mode) limit function, or 9) a safety function, depending on the calculated valet driving evaluation score or a plurality of levels. This will be set forth in following Table 1.

TABLE 1

| Target object | Control type | Control unit in charge |
| --- | --- | --- |
| Engine | Raise a demand power threshold value becoming a reference of engine starting. Prohibit engine starting by air-conditioning, catalyst-heating and warm-up requests. | HCU |
| Air conditioning | Limit or prohibit air-conditioning power (for example, 50% of available power). Prohibit air conditioning during stopping of the vehicle. | HCU |
| Speed limit | Apply Intelligent Speed Limit Assist (ISLA) to Manual Speed Limit Assist (MSLA) or differentiate limit speeds depending on kinds of roads. | HCU |
| Acceleration limit | Reinforce APS scaling correction/demand torque filtering. Automatically activate an acceleration limiter. | HCU |
| Parking impact | Reduce impulse at a parking stopper by reducing a creep torque or an acceleration torque during parking. Perform activation in R gear position or when a Parking Assist System (PAS) is operated. | HCU |
| Driving evaluation | Exhibit a vehicle driving evaluation function (for example, being implemented in a similar type to the ECO level). Calculate a score by quantifying sudden acceleration/sudden braking, a parking position, parking impact, etc. | AVN/HCU |
| Parking place | Park the vehicle somewhere else when it is parked in a no-parking area, an area having a steep slope or an area having an excessive amount of sunlight. Perform demand output and parking prohibition control. | CLU/HCU, SCU |
| Mode limit | Prohibit use of the sports mode. Forcibly execute the eco mode. | CLU |
| Safety function | Automatically activate an emergency braking apparatus, a Blind Spot Detection (BSD) system and a lane departure warning system. Increase the volume of alarm sound. | CLU |

In Table 1, HCU indicates a Hybrid Control Unit, an AVN indicates an Audio/Video/Navigation system, a CLU indicates a cluster control unit, and an SCU indicates an SBW Control Unit. The respective target objects to be controlled, the control types and the control units in charge, set forth in Table 1, are merely exemplary, and the present disclosure may not be limited thereto.

First, the configuration of a control unit which controls driving evaluation in the valet mode according to one embodiment of the present disclosure.

FIG. 1 is a block diagram showing an example of the configuration of the control unit which controls driving evaluation in the valet mode according to one embodiment of the present disclosure.

Referring to FIG. 1, a valet mode control unit 100 configured to control driving evaluation for valet parking in the valet mode may use an Accelerator Position Sensor (APS) value, a Brake Position Sensor (BPS) value, State Of Charge (SOC) information of a battery, navigation information, speed and acceleration information, driving distance information (detected by an odometer), illuminance information, slope information, time information, engine information, commands input from a user, etc., as input information. Further, control commands regarding driving evaluation in the valet mode, which may be transmitted to other control units, may be used as output information.

The APS value and the BPS value may be acquired by sensors configured to sense amounts of operation of respective pedals, and may be replaced with demand powers or demand torques transmitted from an upper-level control unit for controlling the powertrain (for example, a hybrid control unit).

The State Of Charge (SOC) means the charged state of the high-voltage battery configured to supply power to an electric motor (not shown), which outputs driving power, and may be acquired by a battery sensor or a battery control unit (for example, a Battery Management System (BMS)).

The navigation information may be acquired by the Audio/Video/Navigation (AVN) system, and may include information regarding a road type corresponding to a road at the current position of the vehicle or a road located in front of the vehicle within a designated distance, limit speeds, whether or not there may be a parking lot, etc. Such information may be merely exemplary, and the present disclosure may not be limited thereto.

The speed information may be acquired by a vehicle speed sensor, and the acceleration information may be acquired by an acceleration sensor. Such information may be merely exemplary, and the present disclosure may not be limited thereto. For example, the acceleration information may be acquired by differentiating the speed information.

The driving distance information may be acquired by a cluster.

The illuminance information may be acquired by an illuminance sensor.

The slope information may be acquired by a gyro sensor.

The time information may be acquired by the Audio/Video/Navigation (AVN) system.

As the engine information, turning-on information and turning-off information of an engine may be acquired by the hybrid control unit.

User inputs may be input through a command input unit provided in the vehicle, for example, a dial, a key button, a touch button, a touchscreen or the like, and may be transmitted via a telematics center by executing an application installed in a driver or user smart device, smart phone or portable terminal depending on implementation.

Sources of the above-described respective input information may be focused on initial sources of the corresponding information, and the input information may be information which may be transmitted to the valet mode control unit 100 via other control units or be information which has undergo processing, such as filtering, by other control units depending on the configuration of the vehicle.

The valet mode control unit 100 may include an entry determiner 100, an evaluation factor determiner 130, a controller 130 and a display 140.

The valet mode control unit 100 applicable to the embodiments of the present disclosure may be accompanied by control of the powertrain depending on the valet driving evaluation score, and may thus be implemented as an upper-level control unit having the integrated control function of the powertrain, such as the Vehicle Control Unit (VCU) in case of an Electric Vehicle (EV) or the Hybrid Control Unit (HCU) in case of a Hybrid Electric Vehicle (HEV), without being limited thereto.

Hereinafter, the respective elements of the valet mode control unit 100 may be described in more detail.

First, the entry determiner 110 may determine whether or not predetermined valet mode entry conditions may be satisfied. The entry determiner 110 may determine whether or not at least one of the predetermined valet mode entry conditions may be satisfied, and may determine activation of the valet mode when at least one of the predetermined valet mode entry conditions may be satisfied. Examples of the predetermined valet mode entry conditions may be as follows, but the present disclosure may not be limited thereto.

A case in which a command for entering the valet mode may be manually input by the vehicle owner through the AVN system or a User Setting Menu (USM)

A case in which the command for entering the valet mode may be input through remote control using wireless communication (for example, a case in which the command may be transmitted to the valet mode control unit 100 via a telematics system, or the command may be input from a portable terminal connected to the valet mode control unit 100 through near field communication, such as Wi-Fi or Bluetooth, or the like)

A case in which, after opening and closing of a driver's seat door may be sensed, a driver's weight measured by a seat detection sensor may be varied (i.e., a case in which driver change may be sensed)

A case in which vehicle's arrival at a predetermined position (for example, an airport, a hotel, a restaurant, a parking lot, a position determined as a valet parking enabling area by the navigation system, a position set by the driver, or the like) may be sensed by the navigation system A case in which the vehicle arrives at a specific position learned by the navigation system or set based on big data in the state of being interlocked with the telematics center (for example, the big data including the previous setting history of the driver, the setting histories of other drivers, or the like)

A case in which a device which has already been registered, may be changed to a non-connected state through Bluetooth A case in which the Parking Assist System (PAS) may be operated (the PAS including a Smart Parking Assist System (SPAS) or a Remote Smart Parking Assist (RSPA) system, without being limited thereto)

A case in which it may be determined that the vehicle may be in a parking lot mode through inner logic based on the sensor information of the vehicle (for example, through analysis of operation of the APS and BPS, etc.)

A case in which, in case of a hybrid electric vehicle, the Hybrid Control Unit (HCU) determines that the vehicle may be in the parking lot mode by analyzing operation of the APS and BPS so as to prevent frequent On and Off of the engine in a parking lot (but determination as to whether or not the vehicle in the parking lot mode may not be limited thereto, and may be carried out through deep learning)

Thereafter, the evaluation factor determiner 120 may determine a plurality of driving evaluation factors for valet parking based on at least one of a vehicle status or a driving environment, when at least one of the entry conditions may be satisfied as a result of the determination. That is, the evaluation factor determiner 120 may determine any one of the plurality of driving evaluation factors for valet parking, corresponding to a current situation, based on at least one of the vehicle status or the driving environment, when the entry determiner 110 determines activation of the valet mode function.

For example, the evaluation factor determiner 120 may calculate at least one driving evaluation factor as a point or a score depending on an evaluation index, and may classify the calculated point or score into at least one level depending on a predetermined threshold value, under the control of the valet mode controller 100.

The driving evaluation factors may become evaluation indexes by the following determination conditions. The evaluation indexes may be referred to as valet driving evaluation indexes. Examples of the driving evaluation factors may be as follows, but the present disclosure may not be limited thereto.

Impulse when the vehicle collides with a parking stopper (For example, impulse when the vehicle collides with a parking stopper may serve as an valet driving evaluation index)

A degree of impulse may be calculated or extracted through a wheel speed change, a difference between a wheel speed and an acceleration sensor value, a pitch rate, etc.

A wheel speed change (For example, at the moment when the vehicle collides with a parking stopper, the vehicle may be pushed forwards and a wheel speed may be rapidly reduced. Since an acceleration sensor may be located at the middle portion of the vehicle, which may be higher than the position of the wheels of the vehicle, and may be connected to the wheels through suspensions, a vehicle speed change (the integral value of the acceleration sensor value) may be less rapid, but the vehicle speed may fluctuate. Therefore, a degree of rapidness of the wheel speed change may become an index of impulse.)

A difference between the wheel speed and the acceleration sensor value (For example, at the moment when the vehicle collides with the parking stopper, the wheel speed may differ from the integral value of the acceleration sensor value, and may also differ from an acceleration. At the moment when the vehicle collides with the parking stopper, a pitch rate may be calculated due to a height difference between the wheels and the acceleration sensor. A value acquired by integrating a difference between the acceleration sensor value and the differential value of the wheel speed may be the pitch rate. The difference between the acceleration sensor value and the differential value of the wheel speed (i.e., the pitch rate) may become an index of impulse.)

The pitch rate (For example, it may be detected that the vehicle may be pushed forwards through a pitch sensor, and a value acquired by the pitch sensor may become an index of impulse.)

In the above-described calculation of the impulse, a difference due to sudden braking may be excluded.

For example, even during sudden braking, impulse corresponding to a wheel speed change, a difference between a wheel speed and an acceleration sensor value, and a pitch rate may be calculated. Since information, such as brake information (the amount of force applied to the brake pedal enough to be determined as sudden braking), a braking torque (a torque enough to be determined as sudden braking), etc., may be used, the difference due to sudden braking should be excluded. However, a degree of sudden braking may be considered as a driving evaluation factor.

A degree of sudden acceleration or sudden braking (For example, an Accelerator Position Sensor (APS) value, a Delta APS value, a speed change, an acceleration change, a Brake Position Sensor (BPS) value, a Delta BPS value, a braking amount, or the like may become an index of the degree of sudden acceleration or sudden braking, i.e., an index of valet driving evaluation.)

Driving distance and time in the valet mode (For example, the driving distance and time until parking of the vehicle has been completed after entering the valet mode may become indexes of valet driving evaluation.)

A frequency of turning-on of the engine (For example, the number of times of turning-on of the engine may be counted, and may become an index of valet driving evaluation.)

A frequency of gear shifts (D gear position <–> R gear position) (For example, the number of times of gear shifts to D gear position or R gear position so as to park the vehicle at a low speed may be counted, and may become an index of valet driving evaluation.)

A degree of shaking of the vehicle (For example, the degree of shaking of the vehicle detected by the acceleration sensor, the speed sensor, and the pitch sensor (or the gyro sensor) may become an index of valet driving evaluation, for example, on a stone road.)

Preference for a parking position (For example, a degree of preference calculated through information regarding preferred parking areas predetermined by the vehicle owner, navigation information, camera information, etc., may become an index of valet driving evaluation.)

A slope of a parking position (For example, a slope level determined depending on the slope [%] of the parking position may become an index of valet driving evaluation.)

A degree of exposure of the vehicle to sunlight (For example, a level of exposure of the vehicle to sunlight determined through position, latitude, altitude, time, season and weather information, an illuminance sensor, an outdoor temperature sensor, etc. may become an index of valet driving evaluation.)

The controller 130 may include an evaluation score calculator 131 configured to calculate a valet driving evaluation score by analyzing the determined driving evaluation factors and collecting result values acquired through analysis, and a driving guide unit 132 configured to guide the vehicle owner or a driver other than the vehicle owner so as to achieve a high valet driving evaluation score.

The evaluation score calculator 131 may calculate the valet driving evaluation score by adding the driving evaluation factors determined by the evaluation factor determiner 120, under the condition that weights may be applied to the driving evaluation factors.

For example, $Score_1 = Score_{slope} + Score_{Impulse}$. The valet driving evaluation score may be expressed as $Score_1$ and, among the plurality of driving evaluation factors, a degree of slope may be expressed as $Score_{slope}$, and a degree of impulse may be expressed as $Score_{Impulse}$.

Further, the evaluation score calculator 131 may apply different predetermined weights to the plurality of determined driving evaluation factors. The predetermined weights may have different values depending on the vehicle status, the driving environment, the environment of a valet parking region, etc.

Otherwise, a user or the vehicle owner may apply different predetermined weights to each of the respective driving evaluation factors in consideration of the vehicle status, the driving environment, the environment of the valet parking region, etc. through the display 140 which will be described below. That is, the evaluation score calculator 131 may apply the predetermined weights set by the vehicle owner to the respective driving evaluation factors when the driving evaluation factors may be added. For example, $Score_1 = w_{slope} \times Score_{slope} + w_{impulse} \times Score_{Impulse}$.

The valet driving evaluation score may be expressed as $Score_1$ and, among the plurality of driving evaluation factors, the degree of slope may be expressed as $Score_{slope}$, and the degree of impulse may be expressed as $Score_{Impulse}$. Here, the weight for the degree of slope may be expressed as $w_{slope}$, and the weight for the degree of impulse may be expressed as $w_{Impulse}$.

Further, a weight may be 0. This means that a corresponding factor may not be considered. For example, when $w_{slope}=0$, this means that the degree of slope may not be considered as a score.

In the valet mode, the evaluation score calculator 131 may analyze the plurality of driving evaluation factors determined until valet parking has been completed, and may continue to calculate or operate the valet driving evaluation score based on result values acquired through analysis. That is, the evaluation score calculator 131 may continuously calculate the valet driving evaluation score during a driving time.

Further, the evaluation score calculator 131 may calculate the valet driving evaluation score as at least one level. For example, the valet driving evaluation score, which may be less than or equal to 50, may be referred to as level 1, the valet driving evaluation score, which may be in the range of 50 to 70, may be referred to as level 2, the valet driving evaluation score, which may be in the range of 70 to 90, may be referred to as level 3, and the valet driving evaluation score, which may be greater than or equal to 90, may be referred to as level 4.

The driving guide unit 132 may guide the vehicle owner or a driver other than the vehicle owner so as to achieve a high valet driving evaluation score under the control of the controller 130. The driving guide unit 132 may guide the vehicle owner or the driver other than the vehicle owner so as to press less hard or harder on the accelerator pedal or the brake pedal under the control of the controller 130, when a difference between a proper APS or BPS value and a current APS or BPS value may be greater than or equal to a designated value. The driving guide unit 132 may inform the vehicle owner or the driver other than the vehicle owner that the vehicle may be properly driving now, when the current APS or BPS value reaches the proper APS or BPS value, under the control of the controller 130. The proper APS or BPS value may be calculated or operated in consideration of a current vehicle speed, a slope, distance information, etc., under the control of the controller 130.

The driving guide unit 132 may estimate a distance from a parking stopper, and may determine the APS value or the BPS value based on the estimated distance under the control of the controller 130.

Further, the driving guide unit 132 may guide the vehicle owner or the driver other than the vehicle owner to compare the current vehicle speed with a proper speed and to increase, decrease or maintain the current vehicle speed under the control of the controller 130 so that the eco-friendly vehicle may drive at the proper speed during valet parking.

The display 140 may display the calculated valet driving evaluation score. The display 140 may be referred to as the AVN system. The display 140 may display a message of "Will you complete parking?" to the driver or inform the vehicle owner of this message through a pop-up, after parking of the vehicle has been completed.

Thereafter, the display 140 may display a message of "The valet driving evaluation score may be 00." through a pop-up, when confirmation of completion of parking has been received. The display 140 may provide the pop-up content to the smart device of the vehicle owner, and may receive confirmation of the content from the vehicle owner under the control of the valet mode control unit 100.

The display 140 may display that the valet driving evaluation score or level may be low or low valet driving evaluation score or levels may be accumulated to the driver or inform the vehicle owner of this face through a warning pop-up.

Further, the display 140 may display various messages to guide high-score driving to the driver or inform the vehicle owner of these messages through a pop-up during operation of the driving guide unit 132. For example, the display 140 may display a message of "The magnitude of force applied to the accelerator pedal may be high. Please be careful.", "The magnitude of force applied to the brake pedal may be perfect.", "Please press harder on the brake pedal so as to reduce parking impact.", or "Please slow down so as to match a proper speed of 30." to the driver or inform the vehicle owner of this message through a pop-up.

As described above, the valet mode control unit 100 may calculate driving evaluation factors based on the driving time, the driving distance, the average speed, the maximum speed, the average acceleration, the maximum acceleration, and the maximum deceleration of the vehicle, the maximum APS value, the maximum BPS value, the frequency of turning-on of the engine, the amount of fuel consumed, the amount of energy consumed by an air conditioner, an idle time, the frequency of starting of the vehicle and turning-off of the engine of the vehicle, the state of charge of the battery using an external power supply, etc., may quantify a valet driving evaluation score based on the calculated driving evaluation factors, and may transmit the valet driving evaluation score to the terminal of a vehicle owner or a user through the telematics center or output the valet driving evaluation score through the display in the vehicle. Here, the frequency of turning-on of the engine, the amount of fuel consumed, the frequency of starting the vehicle and turning-off of the engine of the vehicle, etc. may be applied only to eco-friendly vehicles (for example, HEVs and PHEVs) provided with an engine.

Further, the valet mode control unit 100 may activate safety assistance systems and functions, such as an emergency braking apparatus, a Blind Spot Detection (BSD) system and a lane departure warning system, based on the vehicle status or the driving environment, and may automatically set at least one of speed limit functions using a speed corresponding to speed limit information acquired by a navigation system or a camera or a predetermined maximum speed (ex. 100 kph). Similarly, an acceleration limit may, of course, be set.

Figure 2:
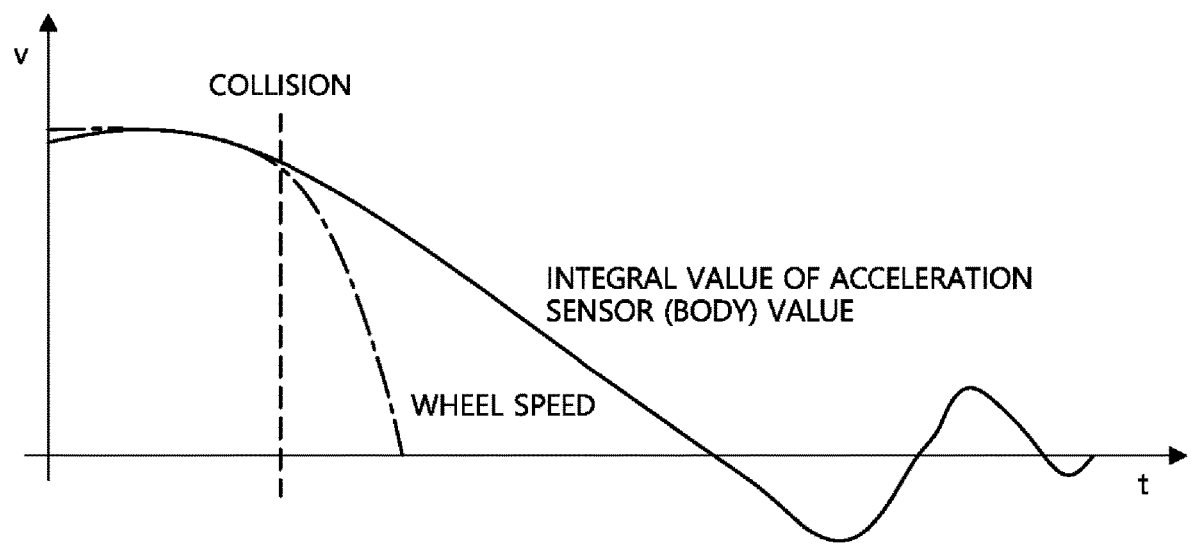
FIG. 2 is a graph showing an example of the form of a wheel speed change according to one embodiment of the present disclosure.

FIG. 2 is a graph showing an example of the form of a wheel speed change according to one embodiment of the present disclosure.

The graph of FIG. 2 shows a difference between a wheel speed and an acceleration sensor value, at the moment when an eco-friendly vehicle collides with a parking stopper.

Here, the horizontal axis may indicate time, and the vertical axis may indicate speed. At the moment when the vehicle driving at a designated speed collides with the parking stopper, the wheel speed may be rapidly decreased and, in contrast, a vehicle speed may be changed less rapidly than the wheel speed, but may fluctuate.

The reason for this may be that the acceleration sensor may be located at the middle portion of the vehicle, which may be higher than the position of the wheels of the vehicle, and may be connected to the wheels through suspensions. Therefore, a degree of rapidness of the wheel speed change may become an index of impulse.

Figure 3A:
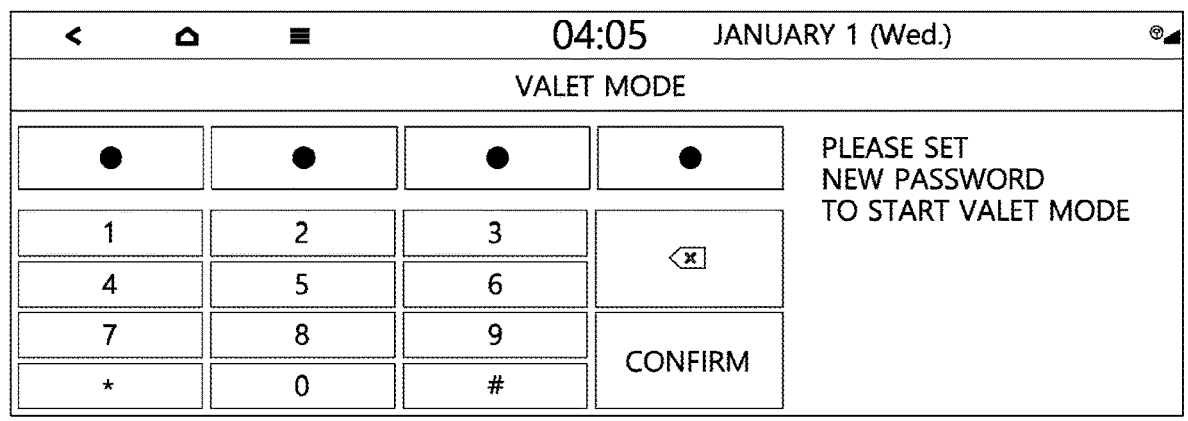

FIGS. 3A and 3B are diagrams showing an example of implementation of the valet mode according to one embodiment of the present disclosure.

Referring to FIGS. 3A and 3B, the valet mode may be a mode in which only necessary information and functions may be selected so that a driver other than a vehicle owner may use and execute the information and the functions.

The vehicle owner may access a vehicle owner or user setting menu (USM) for the valet mode by inputting a designated command through an AVN system. For example, the vehicle owner may access a level setting menu for limiting air conditioning or a level setting menu for limiting a driving mode in the user setting menu (USM) for the valet mode.

In each menu, functions which become current target objects to be set, set driving evaluation factors, and a description of functions depending on the set driving evaluation factors may be displayed.

For example, the valet mode control unit 100 may display a screen so as to set a password, when the vehicle owner selects the valet mode in the user setting menu (USM). The valet mode control unit 100 may determine that at least one of the valet mode entry conditions may be satisfied, when the password may be set.

When the vehicle enters the valet mode, a screen shown in FIG. 3B may be displayed, but the present disclosure may not be limited thereto.

For example, the display 140 may display a valet mode start time, a parking completion time (an engine-off time), driving distance and time, the maximum speed, etc. under the control of the valet mode control unit 100. The corresponding information may be confirmed through an application installed in the smart device of the vehicle owner under the control of the valet mode control unit 100. For example, the application may be the Bluelink application, and vehicle position information may also be displayed.

Further, the valet mode control unit 100 may control operation of a rear camera of the vehicle, an emergency call (SOS), etc. in the valet mode.

The valet mode control unit 100 may release the valet mode, when the set password may be input through the smart terminal of the vehicle owner in the valet mode. However, the valet mode control unit 100 may not be limited thereto, and may release the valet mode even when valet parking has been completed. A detailed description thereof will be given later.

Further, the valet mode control unit 100 may execute a function of preventing additional input of the password so as to protect personal information, when a wrong password may be input a designated number of times.

The above-described process of evaluating driving of the vehicle in the valet mode according to one embodiment of the present disclosure will be summarized with reference to FIGS. 4 to 9.

Figure 4:
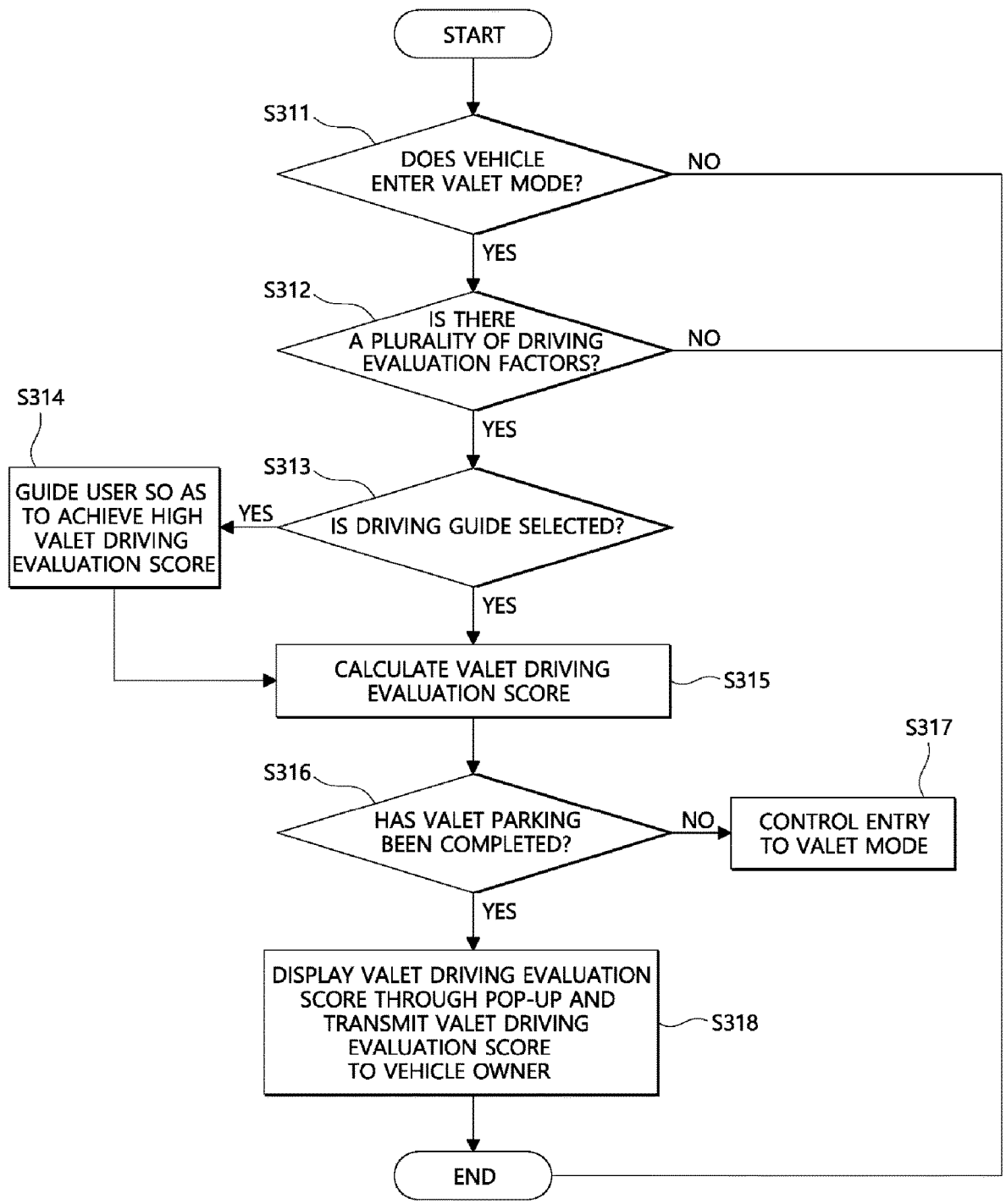
FIG. 4 is a flowchart representing an example of a process of evaluating valet mode driving of a vehicle according to one embodiment of the present disclosure.
Figure 5A:
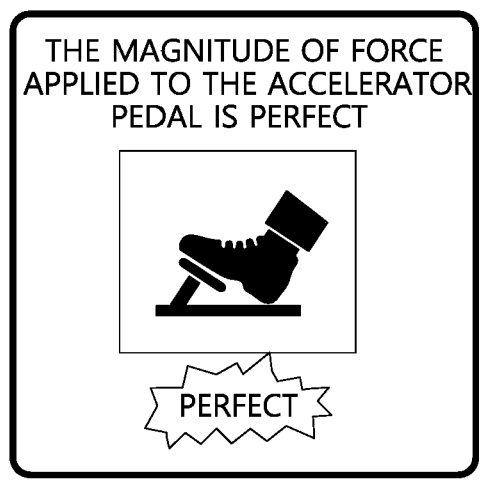
Figure 5B:
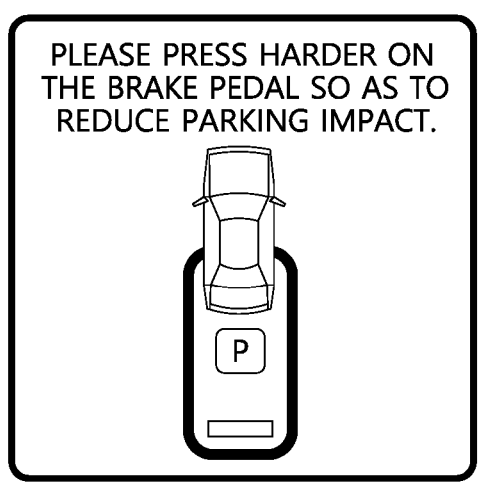
Figure 5C:
Figure 5D:
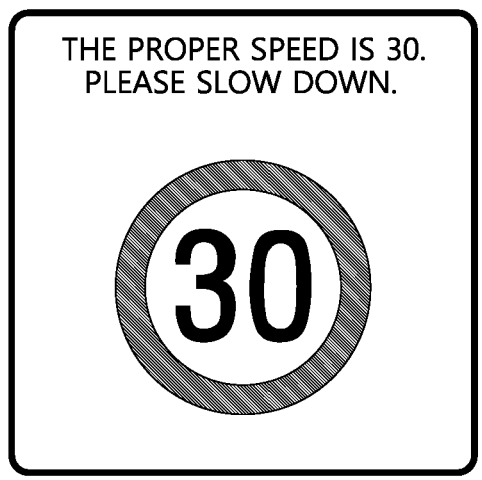

FIG. 4 is a flowchart representing an example of the process of evaluating valet mode driving of the vehicle according to one embodiment of the present disclosure. FIGS. 5 to 9 are diagrams illustrating examples of display the process of evaluating valet mode driving of the vehicle according to one embodiment of the present disclosure through a display or an application.

Referring to FIGS. 4 to 9, the entry determiner 110 of the valet mode control unit 100 may determine whether or not valet mode entry conditions may be satisfied (S311).

When the entry determiner 110 determines that at least one of the valet mode entry conditions may be satisfied (Yes in S311), the evaluation factor determiner 120 may determine a plurality of driving evaluation factors for valet parking based on at least one of a vehicle status or a driving environment (S312).

When the entry determiner 110 determines that at least one of the valet mode entry conditions may not be satisfied (No in S311), the evaluation factor determiner 120 may terminate the valet mode.

The determined driving evaluation factors may be analyzed, and whether or not a driver selects a driving guide may be determined (Yes in S313). When the driver selects the driving guide, a vehicle owner or the driver other than the vehicle owner may be guided so as to achieve a high valet driving evaluation score under the control of the valet mode control unit 100 (S314). As shown in FIGS. 5A to 5D, the display 140 may display messages regarding the driving guide so as to achieve a high valet driving evaluation score under the control of the valet mode control unit 100. For example, the display 140 may display a message of "The magnitude of force applied to the brake pedal may be perfect. (FIG. 5A)", "Please press harder on the brake pedal so as to reduce parking impact. (FIG. 5B)", "The slope may be steep. Please park someplace else. (FIG. 5C)", "A proper speed may be 30. Please slow down. (FIG. 5D)", or may output a voice message through the speaker of the vehicle together with display of such a message under the control of the valet mode control unit 100. The present disclosure may not be limited thereto, and various messages may be displayed.

When the determined driving evaluation factors may be analyzed and the driver does not select driving guide (No in S313), a valet driving evaluation score may be calculated by collecting result values acquired through analysis (S315). Calculation of the valet driving evaluation score was described in detail above with reference to FIGS. 1 to 3, and a description thereof will thus be omitted.

Thereafter, before the calculated valet driving evaluation score may be displayed, whether or not valet parking has been completed may be determined (S316). When valet parking has not been completed, valet mode entry control may be continued (S317).

Figure 6:
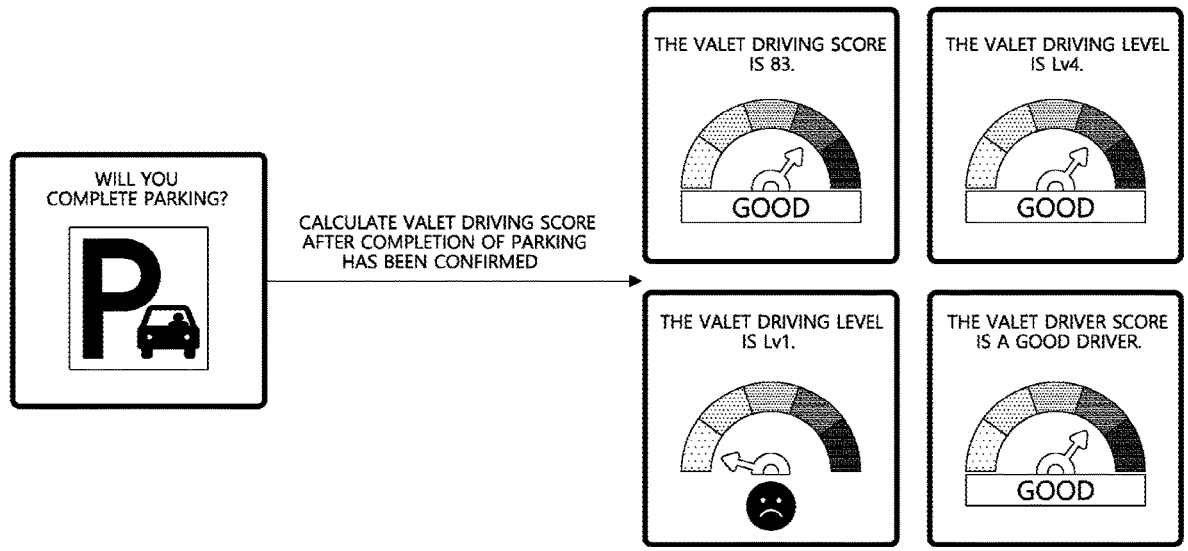

When valet parking has been completed, the calculated valet driving evaluation score may be displayed, as shown in FIG. 6 (S318). The display 140 may display a message of "The valet driving evaluation score is 83.", "The valet driving evaluation level is Lv4.", "The valet driving evaluation level is Lv1.", "The valet driver is a good driver", etc., or may output a voice message through the speaker of the vehicle together with display of such a message under the control of the valet mode control unit 100.

Figure 7:
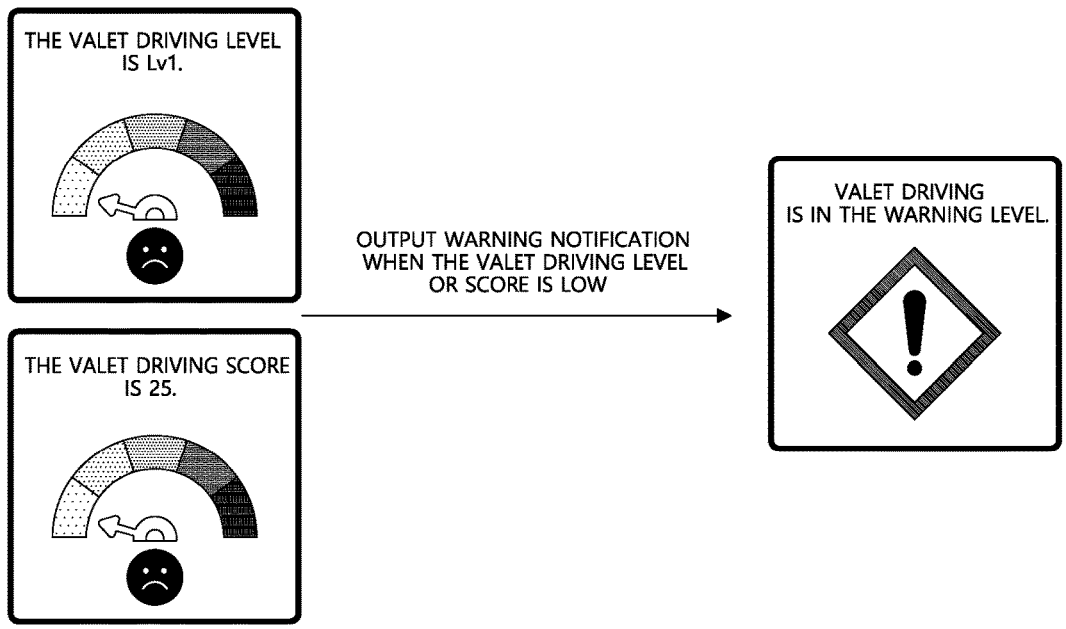
Figure 8A:
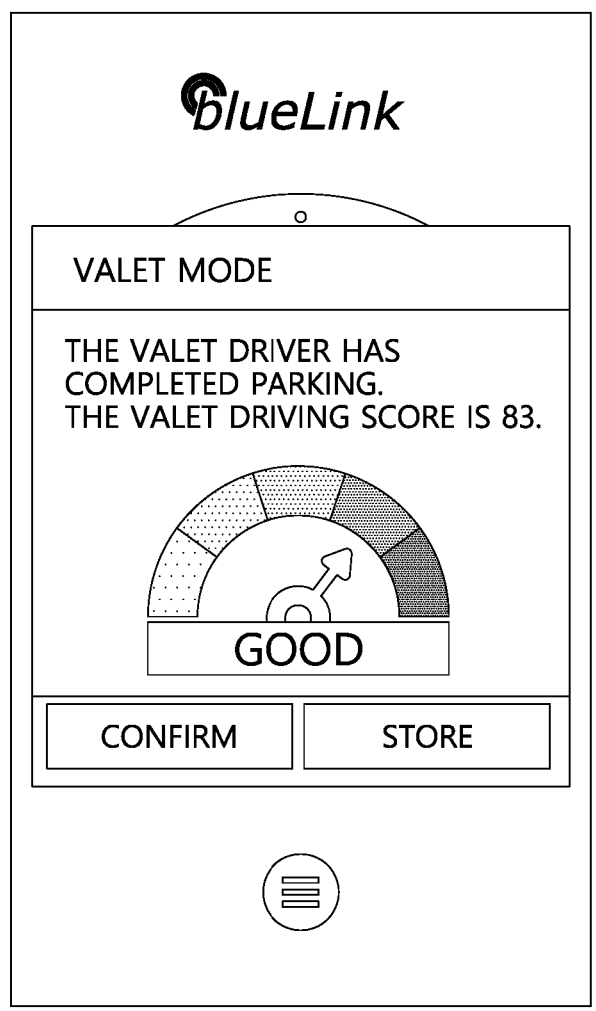
Figure 8B:
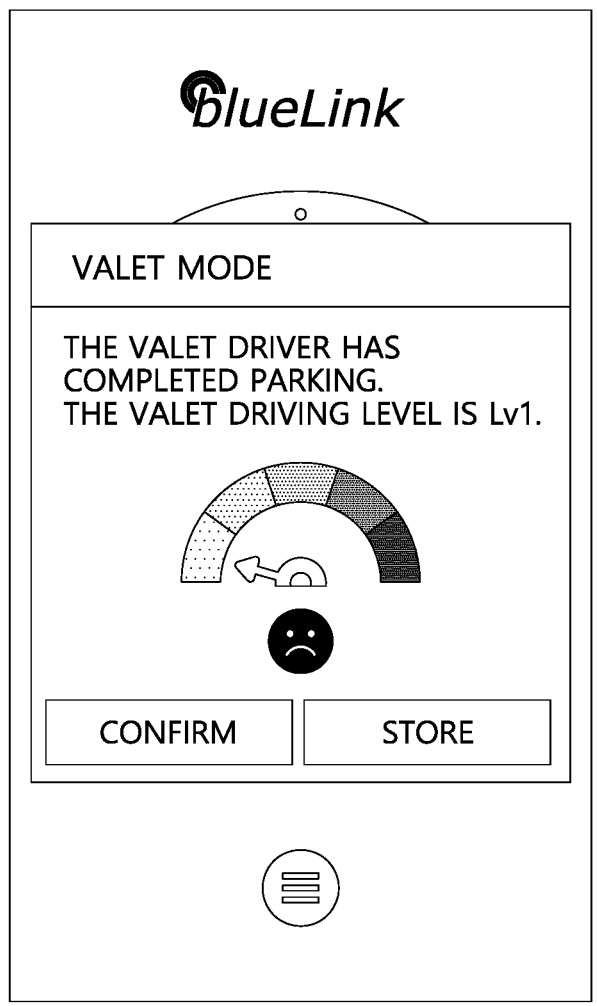
Figure 8C:
Figure 9:
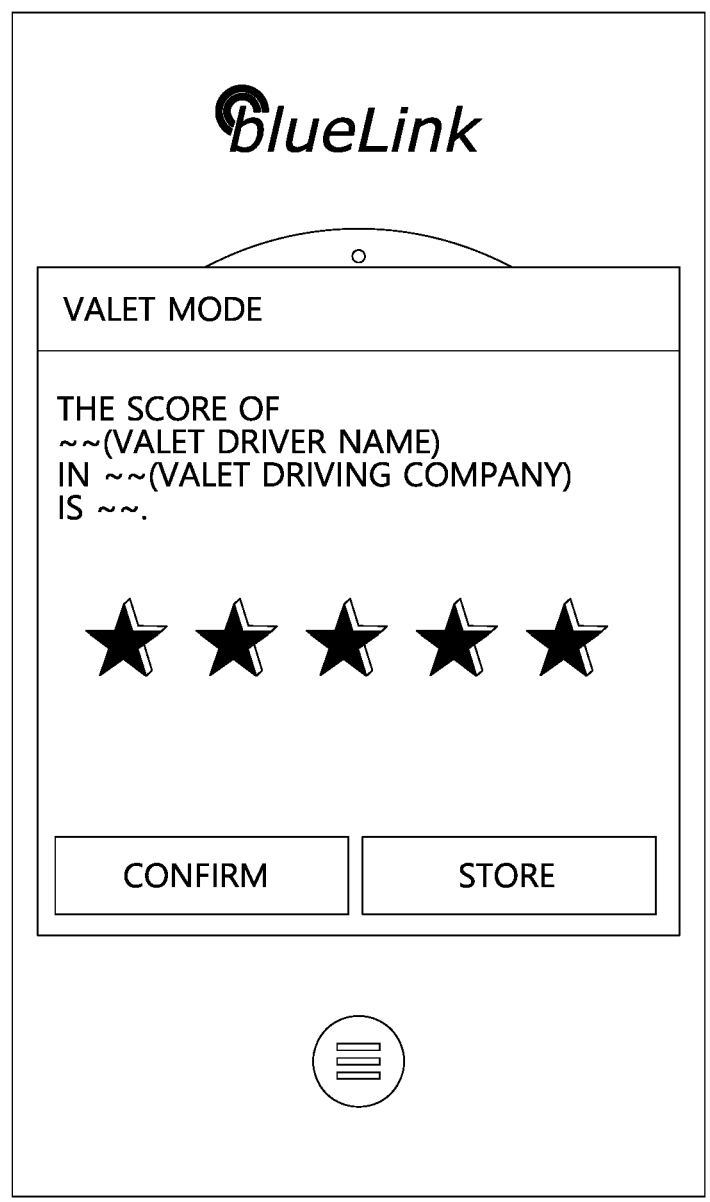

Further, as shown in FIG. 7, the display 140 may display a warning message or a warning notification, when the valet driving evaluation score calculated under the control of the valet mode control unit 100 may be equal to or less than a predetermined score or a predetermined level.

In addition, as shown in FIGS. 8A to 8C and FIG. 9, the valet mode control unit 100 may transmit the valet driving evaluation score and a message on comprehensive evaluation of the valet driver to an application installed in the smart device of the vehicle owner through the communication module of the vehicle. Then, the vehicle owner may confirm the valet driving evaluation score and the comprehensive evaluation of the valet driver through the application.

The above-described level indexing method in which the valet driving evaluation score or the valet driving evaluation level may be classified by numbers in the embodiments of the present disclosure may be merely an example, and means that a control method or kinds may be varied as the level may be varied, and thus, it will be apparent to those skilled in the art that other expressions, such as A, B, C and D, or 4, 3, 2 and 1, may be possible while retaining the original meaning.

Further, in the above-described respective valet driving evaluation scores or valet driving evaluation levels, two or more scores or levels may be integrated, or the score or level may be subdivided into lower levels depending on conditions. In addition, weights of the respective driving evaluation factors may be individually set depending on the vehicle status.

The present disclosure described above may be implemented as computer readable code in a computer readable recording medium in which programs may be recorded. Such computer readable recording media may include all kinds of recording media in which data readable by computer systems may be stored. For example, the computer readable recording media may include a hard disk drive (HDD), a solid-state drive (SSD), a silicon disk drive (SDD), a ROM, a RAM, a CD-ROM, a magnetic tape, a floppy disk, an optical data storage device, etc.

As may be apparent from the above description, an eco-friendly vehicle and a method for evaluating valet mode driving therefor according to the above-described various embodiments of the present disclosure may quantify a valet driving evaluation score based on at least one driving evaluation factor in the valet mode of the eco-friendly vehicle, thereby being capable of relieving anxiety of a vehicle owner and improving reliability in marketability of the vehicle.

Further, the eco-friendly vehicle and the method for evaluating valet mode driving therefor according to the various embodiments of the present disclosure guide the eco-friendly vehicle to be driven so as to be suited to a vehicle status or a driving environment in the valet mode, thereby allowing the vehicle to be stably driven and to be parked in a safe place, and thus being capable of relieving anxiety of the vehicle owner and improving reliability in marketability of the vehicle.

It will be apparent to those skilled in the art that various modifications and variations may be made in the present disclosure without departing from the spirit or scope of the disclosure. Thus, it may be intended that the present disclosure cover the modifications and variations of this disclosure provided they come within the scope of the appended claims and their equivalents.

What is claimed is:

1. A method for evaluating valet mode driving of a vehicle, the method comprising:
    determining whether or not a valet mode entry condition is satisfied;
    determining a plurality of driving evaluation factors for valet parking based on at least one of a vehicle status or a driving environment, upon determining that the valet mode entry condition is satisfied;
    calculating a valet driving evaluation score by analyzing the determined driving evaluation factors and collecting result values acquired through analysis; and
    displaying the calculated valet driving evaluation score.

2. The method according to claim 1, further comprising guiding the valet parking so as to allow the valet driving evaluation score to reach a high score.

3. The method according to claim 2, wherein different weights predetermined depending on the plurality of determined driving evaluation factors are applied to the respective driving evaluation factors.

4. The method according to claim 1, wherein the plurality of driving evaluation factors comprises at least one of impulse of the vehicle, sudden acceleration and sudden braking, a driving distance of the vehicle, a frequency of turning-on of an engine of the vehicle, a frequency of gear shifts of the vehicle, or shaking of the vehicle.

5. The method according to claim 4, wherein the impulse of the vehicle is extracted or calculated using at least one of a wheel speed change of the vehicle, a difference between a wheel speed and an acceleration sensor value of the vehicle, or a pitch rate.

6. The method according to claim 1, wherein, in the calculating the valet driving evaluation score, the valet driving evaluation score is continuously calculated until the valet parking has been completed.

7. The method according to claim 1, wherein, in the displaying the calculated valet driving evaluation score, the calculated valet driving evaluation score is compared with a predetermined evaluation score, and a warning notification is output and is transmitted to a smart device of a vehicle owner, when the calculated valet driving evaluation score is less than the predetermined evaluation score.

8. The method according to claim 2, wherein, upon determining that the valet mode entry condition is satisfied, an emergency braking apparatus, a Blind Spot Detection (BSD) system, a lane departure warning system, or safety assistance systems and functions are controlled to be activated based on the vehicle status or the driving environment in a valet mode.

9. A non-transitory computer readable recording medium having recorded thereon a program to execute the method according to claim 1.

10. An apparatus for evaluating valet mode driving of a vehicle, the apparatus comprising:
    an entry determiner configured to determine whether or not a valet mode entry condition is satisfied;
    an evaluation factor determiner configured to determine a plurality of driving evaluation factors for valet parking based on at least one of a vehicle status or a driving environment, upon determining that the valet mode entry condition is satisfied;
    a controller comprising an evaluation score calculator configured to calculate a valet driving evaluation score by analyzing the determined driving evaluation factors and collecting result values acquired through analysis; and
    a display configured to display the calculated valet driving evaluation score.

11. The apparatus according to claim 10, wherein the controller further comprises a driving guide unit configured to guide the valet parking so as to allow the valet driving evaluation score to reach a high score.

12. The apparatus according to claim 11, wherein different weights predetermined depending on the plurality of determined driving evaluation factors are applied to the respective driving evaluation factors.

13. The apparatus according to claim 10, wherein the plurality of driving evaluation factors comprises at least one of impulse of the vehicle, sudden acceleration and sudden braking, a driving distance of the vehicle, a frequency of turning-on of an engine of the vehicle, a frequency of gear shifts of the vehicle, or shaking of the vehicle.

14. The apparatus according to claim 13, wherein the impulse of the vehicle is extracted or calculated using at least one of a wheel speed change of the vehicle, a difference between a wheel speed and an acceleration sensor value of the vehicle, or a pitch rate.

15. The apparatus according to claim 10, wherein the evaluation score calculator continuously calculates the valet driving evaluation score until the valet parking has been completed.

16. The apparatus according to claim 10, wherein the display outputs a warning notification and transmits the warning notification to a smart device of a vehicle owner, when the calculated valet driving evaluation score is less than a predetermined evaluation score.

17. The apparatus according to claim 11, wherein the evaluation factor determiner activates an emergency braking apparatus, a Blind Spot Detection (BSD) system, a lane departure warning system, or safety assistance systems and functions based on the vehicle status or the driving environment in a valet mode, upon determining that the valet mode entry condition is satisfied.

* * * * *